March 14, 1967  T. H. LEE ETAL  3,309,555
SPARK-GAP TYPE OF SURGE ARRESTOR FOR A D.-C. SYSTEM
Filed July 31, 1963  2 Sheets-Sheet 1
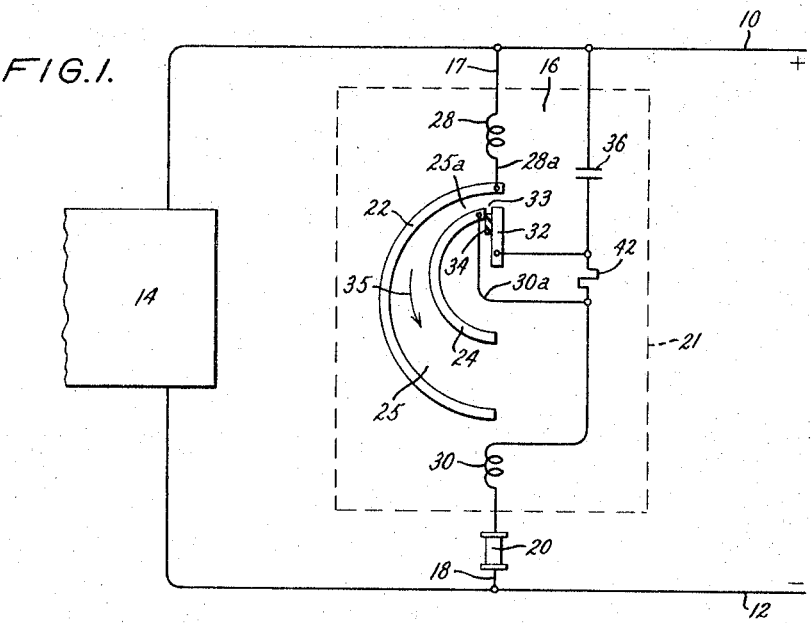
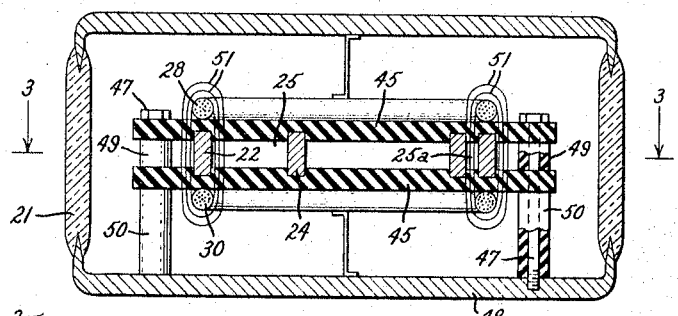
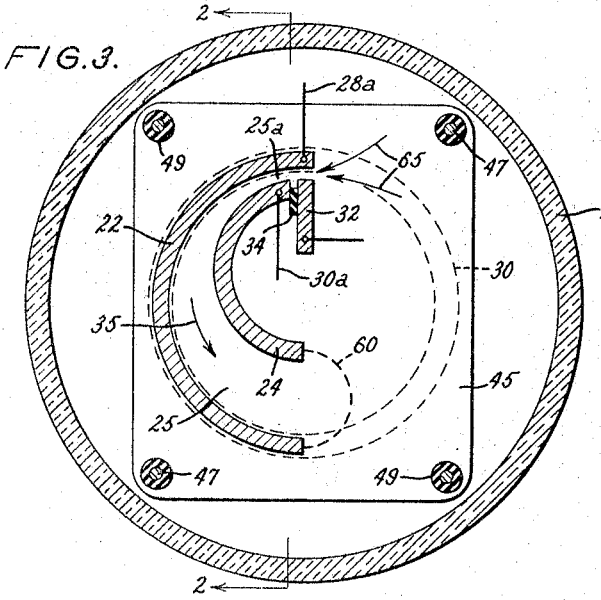
INVENTORS:
THOMAS H. LEE,
TSENG W. LIAO,
BY William Freedman
ATTORNEY.

March 14, 1967  T. H. LEE ETAL  3,309,555
SPARK-GAP TYPE OF SURGE ARRESTOR FOR A D.-C. SYSTEM
Filed July 31, 1963  2 Sheets-Sheet 2

INVENTORS:
THOMAS H. LEE,
TSENG W. LIAO,
BY William Freedman
ATTORNEY.

United States Patent Office 3,309,555
Patented Mar. 14, 1967

3,309,555
SPARK-GAP TYPE OF SURGE ARRESTOR FOR A D.-C. SYSTEM
Thomas H. Lee, Nether Providence, and Tseng W. Liao, Media, Pa., assignors to General Electric Company, a corporation of New York
Filed July 31, 1963, Ser. No. 298,942
11 Claims. (Cl. 313—156)

This invention relates to a spark-gap type of surge arrestor for protecting a D.-C. power circuit against the effects of voltage surges and also to a method of effecting such protection. The invention is particularly, though not exclusively, applicable to D.-C. power circuits of a relatively low voltage, e.g., between 400 and 1,000 volts.

The usual spark-gap type of surge arrestor comprises a gap that is caused to spark-over in response to a voltage surge of a predetermined amplitude appearing on the protected power circuit. After the spark-over occurs, an arc is established across the gap, and current flows through the arc to dissipate the energy of the surge from the power circuit. Power current from the power circuit also flows through the arc following spark-over. The surge arrestor must be capable of interrupting this power current when the energy of the surge has been dissipated so as to restore the circuit to its normal condition, i.e., a condition in which no current is passing through the arrestor.

In a surge arrestor for an A.-C. circuit, interruption of the power current that follows spark-over is greatly facilitated by the fact that the power current ultimately passes through a natural current zero. All that is required to interrupt this alternating current is to develop dielectric strength across the gap at a higher rate than the rate of rise of the recovery voltage following the natural current zero. But with a surge arrestor for a D.-C. circuit, the current following spark-over has no natural current zero, and interruption can be effected only by forcing the current to zero and then building up dielectric strength at the required rate.

A general object of our invention is to provide a surge arrestor for a low voltage D.-C. circuit that has a low enough spark-over voltage to protect the low voltage circuit against harmful voltage surges but yet has the ability to interrupt high values of D.-C. current following spark-over as soon as the energy of the surge has been dissipated through the arrestor.

In the surge arrestor of our invention, we drive the D.-C. follow current to zero by building up an arc voltage across the gap that exceeds the instantaneous voltage that is applied to the gap by external factors. This is accomplished by lengthening the arc at a rapid, but carefully controlled, rate in an arc-extinguishing gas consisting essentially of hydrogen.

Hydrogen is exceptionally well suited for low voltage D.-C. surge arrestors because it has a relatively low dielectric strength and yet very good arc-extinguishing properties despite its low dielectric strength. Because of its low dielectric strength, the gap can be relied upon to spark-over at a relatively low voltage, suitable for protecting the low voltage D.-C. system. Yet despite this spark-over at low voltage, the hydrogen is able to increase the arc voltage to a high enough level to force the current to zero and is able to recover its dielectric strength fast enough after current zero to prevent arc reignition if the surge has then been dissipated. Even at low pressures, hydrogen still has very good arc-extinguishing properties, and this enables us to use a pressure low enough to obtain spark-over at the desired low voltage, while still retaining the ability of the hydrogen to interrupt high D.-C. currents.

It may happen that the voltage surge which causes spark-over of the arrestor is a high energy surge that persists for a much longer time than the time required for the current through the arc to be driven to zero following initial spark-over. In such a case, the remaining energy of the surge will cause another spark-over to occur when the current through the arc reaches or approaches zero, and the current following this second spark-over will again be driven toward zero by the arc-extinguishing action of the arrestor. If the surge is still persisting when the arc voltage reaches or approaches its maximum value, another spark-over will occur, permitting still another pulse of current to flow through the arrestor. For the high energy surges typically encountered in high power D.-C. systems, these events can be repeated over and over again, even hundreds of times, during dissipation of a single voltage surge.

Another object of our invention is to provide a D.-C. surge arrestor that is capable of maintaining its basic characteristics, i.e. spark-over voltage and current-interrupting ability, essentially unchanged despite a hundred or more of these current pulses occurring in rapid succession as a result of a high energy voltage surge.

In carrying out our invention in one form, we provide, for a low voltage D.-C. circuit, a surge arrestor that comprises an envelope containing a gas at a pressure of 10 to 20 inches of mercury, the gas consisting essentially of hydrogen. A pair of spaced-apart main electrodes are disposed within the envelope and define a gap therebetween that contains said gas. Suitable means are provided for electrically connecting these main electrodes into the D.-C. circuit. Each of the main electrodes comprises an arc-initiating portion and an arc-running portion. Means comprising a trigger electrode located adjacent the arc-initiating portion of one of the main electrodes is provided for causing an arc to be established between the arc-initiating portions of the main electrodes when the trigger electrode is energized by a voltage pulse on the D.-C. circuit of a predetermined magnitude. Magnetic means is provided for driving the terminals of the arc off the arc-initiating portions of the main electrodes and along the arc-running portions of the electrodes. The electrodes are so shaped that the effective length of the gap increases as the arc moves along the arc-running portions of the electrodes away from the arc-initiating portions, whereby an increasing arc voltage is developed during this arc movement that ultimately rises to a sufficient level to extinguish the arc. The magnetic means moves the arc out of the arc-initiating region very quickly, but the speed of arc motion is maintained sufficiently low that the arc-initiating region can recover its dielectric strength sufficiently by the time the arc reaches its position of maximum arc voltage to withstand a voltage equal to the maximum arc voltage developed when there is no surge energy remaining.

For a better understanding of our invention, reference may be had to the following specification taken in conjunction with the accompanying drawings; wherein:

FIG. 1 is a schematic view of a surge arrestor embodying one form of our invention connected to protect a D.-C. power circuit.

FIG. 2 is a cross-sectional view through an arrestor of the type schematically depicted in FIG. 1. FIG. 2 is taken along the line 2—2 of FIG. 3.

FIG. 3 is a cross sectional view along the line 3—3 of FIG. 2.

Figure 4:
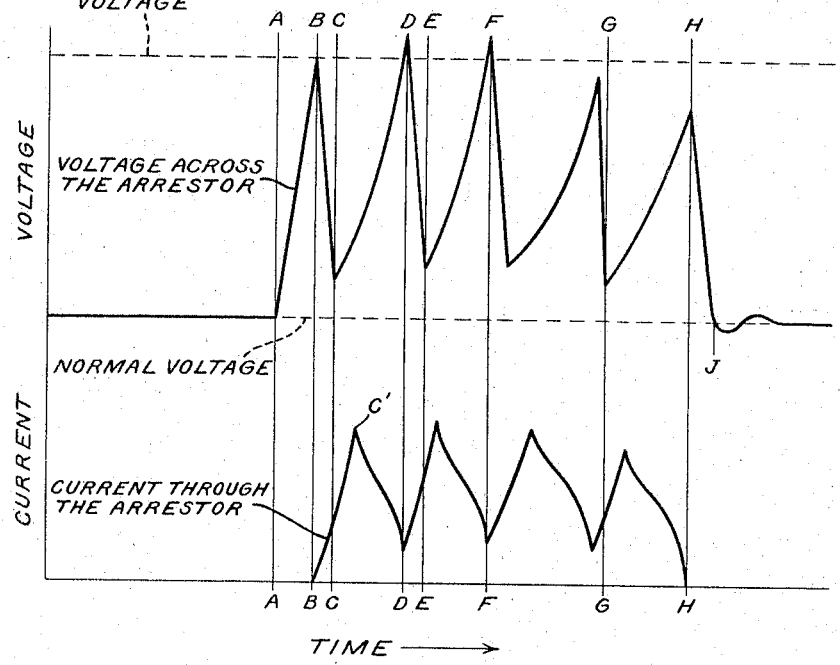
FIG. 4 is a graphical representation of certain operating characteristics of the arrestor of FIGS. 1–3 during a high energy voltage surge.

Referring now to FIG. 1, there is shown a D.-C. circuit comprising a positive bus 10, a negative bus 12, and semi-conductor rectifier equipment 14 connected to to the buses for supplying D.-C. power thereto. For various reasons voltage surges may appear on the buses 10, 12 that could damage the semi-conductor equipment 14 unless suitable protection is provided.

For protecting the equipment 14 from such voltage surges a surge arrestor, schematically shown at 16 is provided. This surge arrestor has one terminal 17 connected to the positive bus 10 and its opposite terminal 18 connected to the negative bus 12, preferably through a resistor 20. The resistor 20 is a non-linear resistor, preferably made of a material having a negative resistance-current characteristic, such as the material sold by General Electric Co. under the trademark Thyrite.

The arrestor 16, which is shown in greater detail in FIGS. 2 and 3, comprises a sealed envelope 21 containing an arc-extinguishing gas consisting essentially of hydrogen. Disposed within the envelope 21 is a pair of spaced-apart main electrodes 22 and 24 defining a gap 25 therebetween across which arcs are adapted to be established. A preferred material for the electrodes is a copper-tungsten mixture, such as that sold under the trade name Elkonite. Stainless steel is also suitable. The electrodes are preferably of a generally semi-circular configuration with one electrode 22 disposed about the other electrode 24. The centers of curvature of the two main electrodes 22 and 24 are offset with respect to each other so that the gap 25 is relatively short in length at one end of the electrodes and gradually increases in length as the other end is approached via a circumferential path extending along the length of the electrodes. The portion 25a of the gap 25 located where the electrodes are close together is referred to hereinafter as the arc-initiating region, and the remainder of the gap 25 is referred to as the arc-running region. The portions of the electrodes in the arc-initiating region 25a are referred to as arc-initiating portions and the other electrode portions are referred to as arc-running portions.

Connected in series with the electrodes 22 and 24 are two arc-propelling coils 28 and 30, one between the terminal 17 and electrode 22, and the other between the terminal 18 and electrode 24. These coils 28 and 30 are used to create a magnetic field for propelling the arc established between the main electrodes 22 and 24, as will soon be explained in greater detail.

For initiating an arc between the main electrodes 22 and 24, a trigger electrode 32 is provided adjacent the arc-initiating portion of the main electrode 24. This trigger electrode 32 is separated from the main electrode 24 by means of a strip of high dielectric constant insulating material 34, preferably of barium titanate. When a surge voltage of a predetermined minimum amplitude is applied between the trigger electrode 32 and main electrode 24, the electric field near the edge of the insulating material is intensified due to the high dielectric constant of the insulating material and a spark will jump across the gap 33 between the trigger electrode and the main electrode 24. The positive ions produced by the spark distort the electric field between the two main electrodes 22 and 24, reducing the breakdown voltage between the main electrodes 22 and 24 to a value below the applied voltage between the main electrodes. This results in an arc between the two main electrodes 22 and 24 in their arc-initiation regions. The current that flows through the arc also flows through the arc-propelling coils 28 and 30, and this produces a magnetic field that drives the arc in the direction of the arrow 35 of FIG. 1, as will soon appear more clearly.

The normal voltage of the circuit 10, 12, which is the voltage normally appearing between the main electrodes 22 and 24, is of insufficient magnitude to break down or flash-over the main gap 25. In the absence of the trigger electrode 32, even voltage surges having a peak of several times normal voltage are insufficient to flash-over the main gap 25. But with the trigger electrode 32 present and connected to be energized by the same potential as applied to the main electrode 22, the voltage on bus 10 at which the main gap will flash-over is reduced to a much lower value, as will soon appear more clearly.

For applying surge voltages to the trigger electrode 32 when they appear across the buses 10, 12 the trigger electrode 32 is connected to the bus 10 through a capacitor 36. Under normal or steady state conditions, the trigger electrode 32 will be essentially isolated from the bus 10 by the capacitor 36. But when surge voltage appears on bus 10, the capacitor presents no significant impedance, and most of the surge voltage will appear across the trigger gap 33 between the trigger electrode 32 and the main electrode 24. The trigger gap 33 has a spark-over voltage that is set at such a value that it will spark over before the surge voltage reaches a damaging magnitude. This spark over voltage is typically set at about 200% of the normal voltage between the buses 10 and 12.

It will be noted that a resistor 42, which has a very low resistance in comparison to the leakage resistance of capacitor 36, is connected between the trigger electrode 32 and the main electrode 24. The purpose of this resistor 42 is to maintain the trigger electrode 32 and the main electrode 24 at substantially the same potential under normal or steady-state conditions, i.e., conditions when no surge voltage is present between the buses 10 and 12. Under these conditions, there is a high resistance current path present across the buses 10, 12 that comprises the series combination of the leakage resistance of capacitor 36, the parallel combination of resistor 42 and the leakage resistance of the trigger gap, and the resistance of elements 30 and 20. The resistance of elements 42, 30, and 20 is very low in comparison to the leakage resistance of the capacitor 36. Hence, almost all the steady state voltage appears across the capacitor 36, and substantialy none of this voltage appears across the resistor 42 and, hence, across the trigger gap 33 in parallel with the resistor 42. Isolating the trigger gap from the steady state voltage is desirable in preventing degradation of the trigger gap and possible false sparkovers.

Referring to FIG. 2, it will be noted that the main electrodes 22 and 24 are mounted between two insulating plates 45 that act as side walls for the arcing gap 25 between the electrodes. These plates 45 are substantially imperforate in the region of the arcing gap 25 and extend generally parallel to the longitudinal axis of any arc between the electrodes 22 and 24. These insulating plates 45 are made of a material that emits very little gas when exposed to an arc, for example, aluminum silicate. The plates 45 are clamped against opposite edges of the electrodes 22 and 24 by suitable fastening means such as the insulating bolts 47 located at spaced apart locations around the outer periphery of plate 45. These bolts 47 extend through aligned openings in the insulating plates 45 and are threaded into an end cap 48 of the envelope 21. Surrounding each bolt 47 between the plates 45 is a spacer 49 of insulating material that limits the clamping pressure applied by the bolts 47. Also surrounding each bolt is a sleeve 50 that supports the insulating plates 45 relative to the end cap 48.

The coils 28 and 30 for creating the arc-propelling magnetic field are mounted on the outer sides of the insulating plates 45. Each of these coils is preferably of a circular configuration as viewed in FIG. 3, and half of the circumference of each coil is disposed approximately in alignment with the semicircular outer electrode 22. The coils are connected in the circuit in such a manner that when current flows through the arrestor, it flows through each of the coils in the same angular direction. Thus, a magnetic field 51 surrounding the two coils 28 and 30 and having the general configuration depicted in FIG. 2 is developed. At all points along the length of the outer electrode 22, this magnetic field 51 extends across the arcing gap 25 in a direction generally perpendicular to the longitudinal axis of any arc between the electrodes 22 and 24. As is known, a magnetic field applied transverse to an arc will coact with the local magnetic field around the arc to drive the arc in a direction transverse to the longitudinal axis of the arc and transverse to the direction of the applied magnetic field. The polarity of the applied magnetic field is selected so that the arc-propelling force is in the direction of arrow 35 in FIGS. 1 and 3. Thus, when an arc is established at the arc-initiating region 25a, it is driven along the electrodes 22 and 24 in the direction of arrow 35 to the opposite end of the electrode.

The motion of the arc in the direction of arrow 35 of FIG. 3 progressively lengthens the arc due to the progresssively increasing length of the arcing gap 25. This progressive lengthening of the arc produces a progressive increase in the arc voltage, which progressively reduces the arcing current. When the arc voltage exceeds the voltage applied by the system to the main gap, the arcing current will rapidly approach zero. If the energy of the voltage surge that initiated the arc has then been dissipated in the arrestor, the arc will be extinguished and no further breakdown of the gap 25 will occur, thus enabling the system to be restored to normal operation. It will be apparent that the highest arc voltage is developed when the arc reaches the end of the electrodes 22, 24 and is bowed outwardly in its central region, as is shown at 60 in FIG. 3. When in this position, the arc has its maximum length.

The arc voltage developed when the arc is in position 60 is also dependent upon the amount of surge energy remaining when the arc reaches this position. If the surge has been completely dissipated when the arc reaches its position 60, then the arc voltage developed will be lower than it was when the surge was still present, but this arc voltage will still exceed the normal circuit voltage and be sufficient to drive the arc current to zero.

It is important that the speed of arc motion be rather carefully controlled. If the arc is moved too slowly, then it vaporizes electrode material so profusely that the insulating plates 45 will quickly become coated with electrode vapor condensate, and the required dielectric strength between the electrodes 22 and 24 is impaired, particularly in the critical arc-initiating region 25a where the gap 25 is short. On the other hand, if the arc is moved too rapidly, then the arc voltage builds up so quickly that the arc-initiating region 25a of the gap 25 does not have an adequate opportunity to recover its dielectric strength sufficiently to withstand the arc voltage that would be developed even after the surge energy has been completely dissipated. This can result in the arc-initiating region 25a continuing to flash-over after the surge has disappeared and can also result in the arc-initiating region 25a repeatedly flashing over well ahead of the time that the arc reaches its position 60. This latter condition results in the arcing duty being concentrated in the arc-initiating region 25a, and this causes excessive electrode vaporization and resultant impairment of the insulating properties of the side plates 45 in the arc-initiating region. To avoid this concentration of arcing duty in the arc-initiating region 25a, the time required for the arc to reach its position 60 at the end of the electrodes 22 and 24 should be made long enough for the arc-initiating region 25a to have then recovered sufficient dielectric strength to withstand a voltage equal to the highest arc voltage that is developed when no surge energy remains. In an actual embodiment of our invention, we have been able to recover substantially all of the original dielectric strength in the arc-initiating region 25a by the time the arc reaches its position 60, which is usually even more dielectric strength than that required to withstand the highest arc voltage developed when no surge remains.

Two additional factors that have an important effect on whether the arc-initiating region 25a will have recovered its dielectric strength sufficiently to withstand the required arc voltage when the arc reaches position 60 are the length of the electrodes 22, 24 and their spacing. The electrode length affects the time required for the arc to reach its position 60 of maximum arc voltage; and the electrode spacing affects the amount of arc voltage built up and the dielectric strength at 25a.

Another factor that controls the rate at which the arc is lengthened to build up arc voltage is the distribution of the magnetic field along the length of the gap 25. By shaping the coils 28 and 30 so that they are approximately in alignment with the outer electrode 22, the field is made essentially uniform along the length of the gap 25 at least in the region adjacent the outer electrode 22. This uniform field relationship contributes to greater uniformity in the speed at which the arc moves along the outer electrode 22.

Another factor, though a minor one, that affects the speed at which the arc is driven along the electrodes 22, 24, is the location on the electrodes at which the leads 28a and 30a to the adjacent coils are connected. By locating these connection points as close as possible to the arc-initiating end of the electrodes, the current flowing through the arc via the electrodes 22, 24 is always forced to follow a loop-shaped path that bows outwardly toward the opposite end of the electrodes. The magnetic effect of current flowing through such a loop-shaped path, as is known, is to urge the arc in a direction to lengthen the loop. Thus, this magnetic effect always urges the arc toward its position 60 of FIG. 3.

The arc voltage that is developed depends not only upon the arc length but also upon a number of other factors. One of the most important of these other factors is the nature of the gas that is present in the gap. Hydrogen is an ideal gas for our arrester not only because of its ability to produce high arc voltages but also because of its relatively low dielectric strength. Because of this low dielectric strength of hydrogen, the trigger gap can be made to spark over at a desired low voltage suitable for protecting the low voltage system 10, 12, 14. Yet despite this low spark-over voltage, adequate arc voltage can be developed with hydrogen to cause the arrester to control the arcing current in the desired manner described herein.

For the protection of low voltage power circuits, i.e., circuits having a normal voltage rating below about 1000 volts, a preferred pressure for the hydrogen is 10 to 20 inches of mercury. Pressures lower than this are generally insufficient because they do not result in enough arc voltage being developed; and pressures higher than this are generally unsatisfactory because they require a trigger voltage too high to protect the low voltage circuit. With special trigger circuits, however, higher pressures can be used.

Another factor that controls the amount of arc voltage that can be developed is the spacing between the insulating side plates 45. If this spacing is greater than about 3/16 inch, the arc will become diffused and the resulting arc voltage will be very low. On the other hand, if the spacing is below about 1/32 inch, then the arc will be unable to move out of the arc-initiating region 25a into the arc running region of the gap 25. This results in excessive electrode heating and vaporization, as well as low arc voltage. We therefore space the side plates 45 by an amount between 1/32 and 3/16 inch, considered along the entire gap 25.

The operation of our arrestor will now be described for a low-energy voltage surge that has a peak voltage high enough to spark over the trigger gap and a total energy that can be dissipated by a single current pulse through the arrestor, e.g., less than 10 watt-seconds. This voltage surge will produce an arc between the main electrodes 22 and 24 in the arc-initiation region 25a due to the previously-described triggering action of the trigger electrode 32. The current that flows through the arc will energize the coils 28 and 30, thus creating a magnetic field that drives the arc in the direction of arrow 35. This increases the arc voltage thereby reducing the arcing current. Ultimately the arc voltage reaches a higher value than the voltage applied by the system to the main gap 25, and this drives the arcing current rapidly toward zero, finally extinguishing the arc. By this time, the energy in the low-energy surge has been completely dissipated in the arrestor and the Thyrite element 20, and thus there is no surge energy remaining to reinitiate the arc, and the system is restored to normal. During the above-described surge dissipation, the Thyrite resistance element 20 helped to limit the current flowing through the gap device; but for many applications, the assistance of the Thyrite element is unnecessary, and the Thyrite element may therefore be dispensed with in such applications.

Assume now that the energy of the voltage surge is much higher, for example, several hundred watt-seconds. The arc will be driven from the arc-initiation region 25a into the position 60 of FIG. 3 and will once again develop an arc voltage high enough to drive the current rapidly toward zero. But only a small portion of the surge energy will have been dissipated by this time, and the remaining surge energy will produce another abrupt voltage rise that will cause the main gap to sparkover in the arc-initiating region 25a, thus initiating another arc between the main electrodes in the arc-initiating region 25a. The first arc may or may not have been completely extinguished at the instant that the second arc is established, but upon establishment of the second arc, the first arc vanishes. The second arc, like its predecessor, is driven in the direction of arrow 35 into position 60 thereby increasing the arc voltage and driving the arc current rapidly toward zero. Just before or as soon as the current reaches zero, the surge voltage resulting from the remaining surge energy initiates a third arc in the arc-initiating region 25a. The second arc vanishes, and the third arc is handled in the same manner as its predecessor. This sequence of events is repeated over and over again until the surge energy is finally completely dissipated. When this complete dissipation occurs, the maximum arc voltage developed when the arc is at position 60 is insufficient to cause a breakdown at the arc-initiation region 25a, and hence the gap acts thereafter to prevent further current flow.

A graphical representation of this repetitive process is shown in FIG. 4, where the voltage across the arrestor is depicted in the upper curve and the arcing current is depicted in the lower curve, both curves having time as an abscissa. The high energy voltage surge is depicted beginning at a time A, then sparking over the arrestor at a time B when it has risen to the spark-over voltage of the arrestor. At this instant B, an arc is struck in the region 25a, as explained previously, causing the circuit voltage to drop momentarily until arc motion can be initiated at an instant C. The arc moves quickly from region 25a to position 60, accompanied by an increase of arc voltage, as explained previously, resulting in a rise in the voltage across the arrestor between instants C and D. During the initial arc-movement from position 25a to 60, the arc current continues to rise, but as the arc voltage builds up, the arc current is forced down toward zero, as shown between instants C' and D. For a high energy surge, only a small portion of the surge energy is dissipated by the current flow during the interval between B and D. The remaining surge energy contributes to the build up of voltage between C and D and causes another spark-over to occur at D. The second spark-over reduces the applied voltage until the resulting arc begins moving out of the arc-initiating region 25a at an instant E. The remaining surge energy contributes to a build up of the applied voltage between E and F, finally causing another spark-over at an instant F. This sequence of events is repeated over and over again until the surge energy has been completely dissipated, at which time the circuit voltage returns to normal, as shown beginning at a time J.

The voltage build-up that occurs just prior to the instant J is depicted between G and H. During this voltage build-up the arc is driven from 25a into its position 60, and this develops enough arc voltage to drive the arcing current completely to zero at the instant H. As explained hereinabove, the arc-initiating region 25a can withstand this arc voltage without breakdown. Hence there will be no further arcing following the instant H and the system will return to its normal condition.

Our arrester has been found capable of dissipating voltage surges having an energy content as high as several thousand watt-seconds and then successfully restoring the circuit to normal immediately upon dissipation of this surge energy. Such high-energy voltage surges cause the arrestor to repeat the above-described spark-over and arcing process hundreds of times in close succession during a single surge. The arrestor has shown a remarkable ability to maintain its basic characteristics substantially intact despite this prolonged series of closely-repetitive operations. In this respect, its spark-over voltage has been maintained approximately constant after each arcing interval in this long series of repetitive arcing intervals; and its arc-extinguishing ability, as measured by the arc voltage developed, has been maintained substantially intact despite the repeated arcing experiences that may have occurred just prior to the occasion that requires arc-extinction.

The ability of our arrestor to maintain a substantially constant spark-over voltage is due in a large part to the fact that the condition of the arrestor in the vicinity of the arc-initiating region 25a is not drastically different from its original condition after each movement of an arc from position 25a to position 60. This is the case because the arc-initiating region 25a is being rapidly cooled by the adjacent electrodes and sidewalls while the arc is displaced therefrom; also because the arc runs rapidly from positions 25a to 60, therefore limiting contamination of this region due to arcing products; and also because fresh hydrogen gas is being introduced into the region around 25a to replace the arc-heated gas that is being swept with the arc toward position 60 and beyond. Referring to FIG. 3, it will be noted that there is a relatively large opening to the right of the arc-initiating region 25a through which the fresh hydrogen gas can enter as shown by the arrows 65.

Our invention relates not only to the surge arrestor as an article but also to a method of protecting a D.-C. system against surges, particularly high-energy surges. As explained hereinabove, we dissipate a high energy surge by admitting current through the gap in a series of closely-repetitive current pulses. Each current pulse is terminated by building up across the gap an arc voltage that exceeds the voltage applied by the circuit to the gap. We prevent additional current flow through the arrestor after the surge energy has been substantially completely dissipated by building up dielectric strength in the arc-initiating region 25a to a sufficiently high level that upon termination of the last pulse, the region 25a can withstand a voltage equal to the maximum arc voltage developed when nosurge energy remains. By admitting the surge energy in the form of these carefully controlled current pulses, we are able to dissipate large amounts of surge energy without damaging the arrestor and at the same time without permitting the voltage across the buses to rise to a damaging level.

Figure 5:
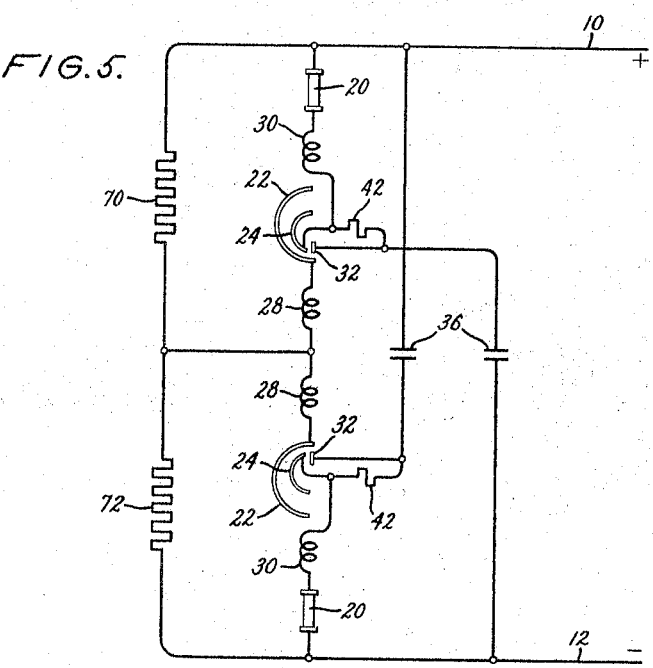
FIG. 5 is a circuit diagram showing a higher voltage application of a surge arrestor embodying certain features of the present invention.

Although our arrestor is especially suited for the protection of low voltage D.-C. circuits, certain of its features can advantageously be used to protect high voltage D.-C. circuits. For such high voltage applications, higher gas pressures are used and a plurality of the gap devices are connected in series. A typical circuit connection for series-connected gap devices is shown in FIG. 5, where those parts corresponding to similar parts in FIG. 1 have been given the same reference numerals. Here the main gaps are connected in series across the buses 10, 12. Each trigger electrode 32 is connected to one of the buses through a capacitor 36 that isolates the trigger gap from steady state voltage but permits the entire surge voltage to be applied to the trigger gap. A pair of series-connected high ohmic resistors 70 and 72 of substantially equal resistance are connected across the buses 10, 12, and a point between the two resistors is electrically connected to a point between the two gap devices, all for the purpose of dividing the steady-state voltage substantially equally between the two gap devices. Each of these gap devices operates in substantially the same manner as the gap device of FIGS. 1–3, with arcs across the two main gaps being developed simultaneously and in series with each other.

For high voltage applications, gases other than hydrogen can be used since the choice of a gas is not dictated by the necessity for having a very low spark-over voltage. Air, for example, can provide adequate arc-extinguishing ability for some high voltage applications even though its pressure is low enough to allow spark-over to occur at the desired surge voltage.

While we have shown and described particular embodiments of our invention, it will be obvious to those skilled in the art that various changes and modifications may be made without departing from our invention in its broader aspects, and we, therefore intend in the appended claims to cover all such changes and modifications as fall within the true spirit and scope of our invention.

What we claim as new and desire to secure by Letters Patent of the United States is:

1. A surge arrestor for a D.-C. circuit comprising:
   (a) an envelope containing a gas,
   (b) a pair of spaced-apart main electrodes within said envelope defining a gap therebetween that contains said gas,
   (c) each of said main electrodes being of a substantially semi-circular configuration with one electrode disposed about the outer periphery of the other,
   (d) each of said electrodes having an arc-initiating portion at one end and the remainder of said electrode constituting an arc-running portion,
   (e) one of said electrodes having a radius substantially smaller than the other and a center of curvature which is offset from the center of curvature of the other in such a manner that the arc-initiating portions of said electrodes are relatively close together and the arc-running portions are at progressively greater distances apart proceeding in a direction away from said arc-initiating portions,
   (f) means comprising a trigger electrode located adjacent the arc-initiating portion of one of said main electrodes for causing an arc to be established between the arc-initiating portions of said main electrodes when said trigger electrode is energized by a voltage pulse of a predetermined magnitude,
   (g) magnetic means for driving the terminals of said arc off the arc-initiating portions of said main electrodes and along the arc-running portions of said main electrodes into a position where an arc voltage high enough to drive the arc current to zero is developed.

2. In the surge arrestor of claim 1, a pair of side walls of insulating material disposed at opposite sides of said main electrodes and extending generally parallel to the longitudinal axis of an arc between said main electrodes.

3. The surge arrestor of claim 1 in which said gas consists essentially of hydrogen.

4. A surge arrestor as set forth in claim 1 and further comprising a pair of side walls of insulating material disposed at opposite sides of said main electrodes and extending generally parallel to the longitudinal axis of an arc between said main electrodes, each of said electrodes having one side facing said arc and an opposite side facing away from said arc, said magnetic means comprising a coil connected in series with said main electrodes and mounted on said opposite side of one of said side walls, the turns of said coil following a path that has a generally semi-circular portion approximately aligned with the outer of said semi-circular electrodes.

5. A surge arrestor as set forth in claim 1 and further comprising a pair of side walls and insulating material disposed at opposite sides of said main electrodes and extending generally parallel to the longitudinal axis of an arc between said main electrodes, each of said electrodes having one side facing said arc and an opposite side facing away from said arc, said magnetic means comprising a pair of coils electrically connected in series with said main electrodes on opposite electrical sides of said gap, said coils being respectively mounted on said opposite sides of said side walls, the turns of said coils following paths that include generally semicircular portions approximately aligned with the outer of said semicircular electrodes.

6. In the surge arrestor of claim 1,
   (a) a pair of sidewalls of insulating material disposed on opposite sides of said main electrodes and extending generally parallel to the longitudinal axis of an arc between said main electrodes,
   (b) means defining a space outside of said gap from which said arc is excluded,
   (c) an open inlet passage leading from said space into the region between said arc-initiating portions of said main electrodes to provide for free entry of fresh gas from said space into said latter region, and
   (d) an open exhaust passage between said sidewalls spaced from said inlet passage and leading from the gap region where high arc voltage is developed to a space outside said gap for exhausting arcing products from said gap.

7. The surge arrestor of claim 6 in which said D.-C. circuit has a rated voltage of between 400 and 1000 volts and said gas consists essentially of hydrogen at a pressure greater than 10 inches of mercury.

8. A surge arrestor for a D.-C. circuit comprising:
   (a) an envelope containing a gas consisting essentially of hydrogen,
   (b) a pair of spaced-apart main electrodes within said envelope defining a gap therebetween that contains said gas,
   (c) means adapted to electrically connect said main electrodes into said D.-C. circuit,
   (d) each of said main electrodes comprising an arc-initiating portion and an arc-running portion extending from said arc-initiating portion to an end region remote from said arc-initiating portion,
   (e) means comprising a trigger electrode located adjacent the arc-initiating portion of one of said main electrodes for causing an arc to be established between the arc-initiating portions of said main electrodes when said trigger electrode is energized by a voltage pulse on said D.-C. circuit of a predetermined magnitude,
   (f) magnetic means for driving the terminals of said arc off the arc-initiating portions of said main electrodes and along the arc-running portions of said main electrodes toward said end regions,
   (g) said electrodes being so shaped that the effective length of said gap gradually increases as said arc moves along the arc-running portions of said electrodes away from said arc-initiating portions, whereby an increasing arc voltage is developed to drive the arc current toward zero, (h) a pair of sidewalls of insulating material disposed at opposite sides of said electrodes and extending generally parallel to the longitudinal axis of an arc between said main electrodes,
(i) means defining a space outside of said gap from which said arc is excluded,
(j) an open inlet passage leading from said space into the region between said arc-initiating portions of said main electrodes to provide for free entry of fresh gas from said space into said latter region,
(k) and an open exhaust passage between said insulating sidewalls spaced from said inlet passage and leading from the region of the gap between said end regions of the main electrodes to a space outside said gap for exhausting arcing products from said gap.

9. The surge arrestor of claim 8 in which said sidewalls are spaced apart by a distance of between 1/32 and 3/16 inch in the region between said main electrodes.

10. The surge arrestor of claim 8 in which said D.-C. circuit has a rated voltage of between 400 and 1000 volts and said hydrogen has a pressure greater than 10 inches of mercury.

11. The surge arrestor of claim 10 in which said sidewalls are spaced apart by a distance of between 1/32 and 3/16 inch in the region between said main electrodes.

References Cited by the Examiner
UNITED STATES PATENTS

| | | | |
|---|---|---|---|
| 1,144,029 | 6/1915 | Creighton | 313—325 X |
| 1,477,303 | 12/1923 | Allcutt | 313—325 X |
| 2,566,895 | 9/1951 | Kalb | 313—156 X |
| 2,825,008 | 2/1958 | Kalb | 315—36 X |
| 3,159,765 | 12/1964 | Schultz et al. | 313—156 X |

References Cited by the Applicant
UNITED STATES PATENTS

| | | |
|---|---|---|
| 2,415,816 | 2/1947 | Depew et al. |
| 2,431,226 | 11/1947 | Berkey et al. |
| 2,456,855 | 12/1948 | Arnott et al. |
| 2,456,986 | 12/1948 | Paluev. |

JAMES W. LAWRENCE, *Primary Examiner.*

P. C. DEMEO, *Assistant Examiner.*